No. 695,003. Patented Mar. 11, 1902.
O. SNELL.
MOVING PICTURE MACHINE.
(Application filed Apr. 2, 1900.)
(No Model.) 4 Sheets—Sheet 1.

WITNESSES:
H. L. Brown
A. E. Keith

INVENTOR:
Oscar Snell.

No. 695,003. Patented Mar. 11, 1902.
O. SNELL.
MOVING PICTURE MACHINE.
(Application filed Apr. 2, 1900.)
(No Model.) 4 Sheets—Sheet 2.

WITNESSES:
H L Brown
A. E. Keith

INVENTOR:
Oscar Snell.

THE NORRIS PETERS CO., PHOTO-LITHO., WASHINGTON, D. C.

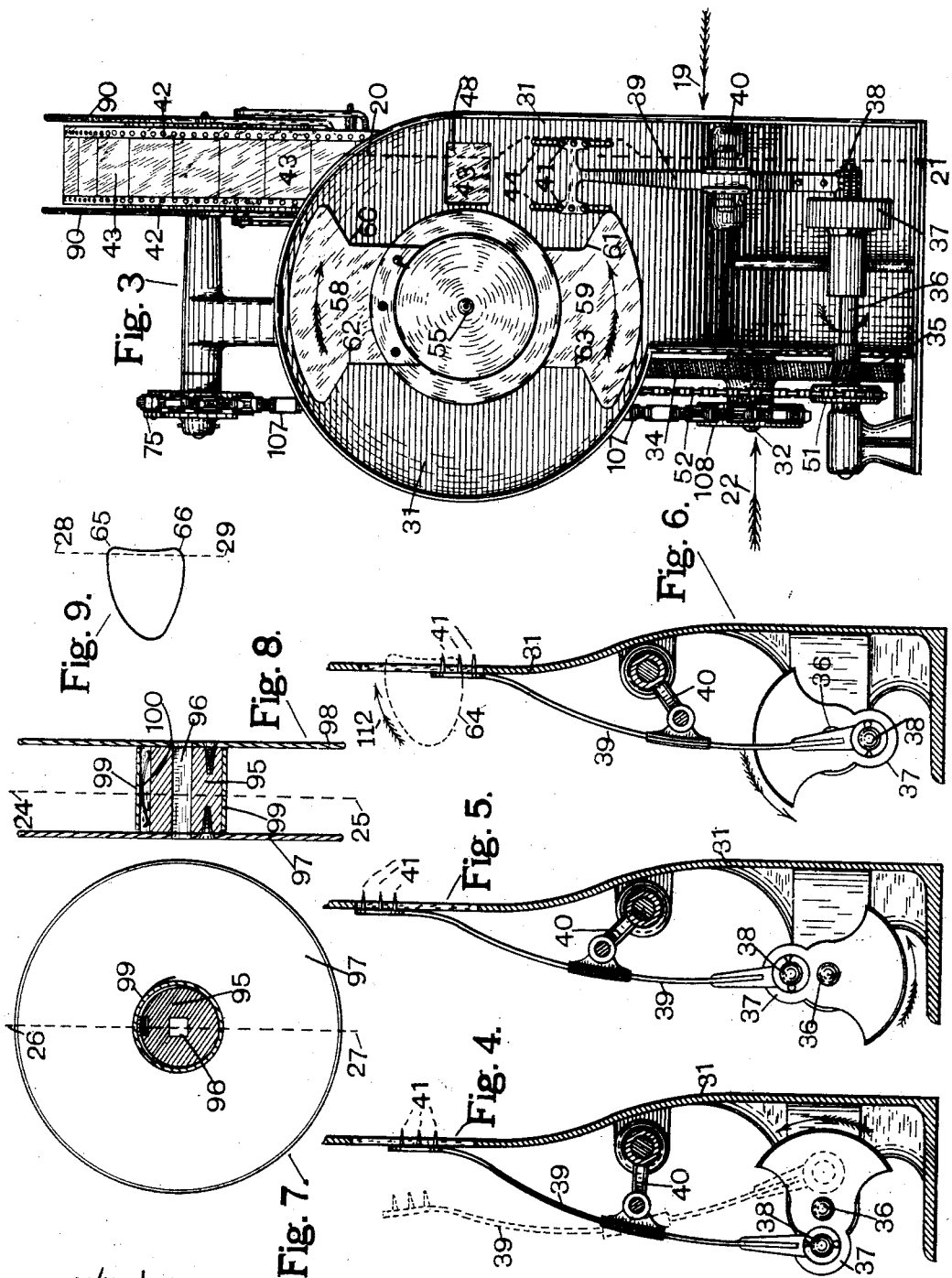

No. 695,003.    Patented Mar. 11, 1902.
O. SNELL.
MOVING PICTURE MACHINE.
(Application filed Apr. 2, 1900.)
(No Model.)    4 Sheets—Sheet 4.

WITNESSES:
H. L. Browne
A. E. Keith

INVENTOR:
Oscar Snell.

UNITED STATES PATENT OFFICE.

OSCAR SNELL, OF CHICAGO, ILLINOIS, ASSIGNOR OF ONE-HALF TO ALEXANDER E. KEITH, OF CHICAGO, ILLINOIS.

MOVING-PICTURE MACHINE.

SPECIFICATION forming part of Letters Patent No. 695,003, dated March 11, 1902.

Application filed April 2, 1900. Serial No. 11,139. (No model.)

*To all whom it may concern:*

Be it known that I, OSCAR SNELL, a citizen of the United States, residing at Chicago, in the county of Cook and State of Illinois, have invented a new and useful Moving-Picture Machine, of which the following is a specification.

My invention relates to moving-picture machines; and my object is to produce a system of mechanism which is particularly adapted to attain very high results in first taking the original pictures or negatives, then printing the positives or photographic copies from the negatives, and finally serve as a means for intermittently moving the photographic film in projecting the pictures upon a screen, as is hereinafter more particularly described, and illustrated in the accompanying drawings, in which—

Figure 1:
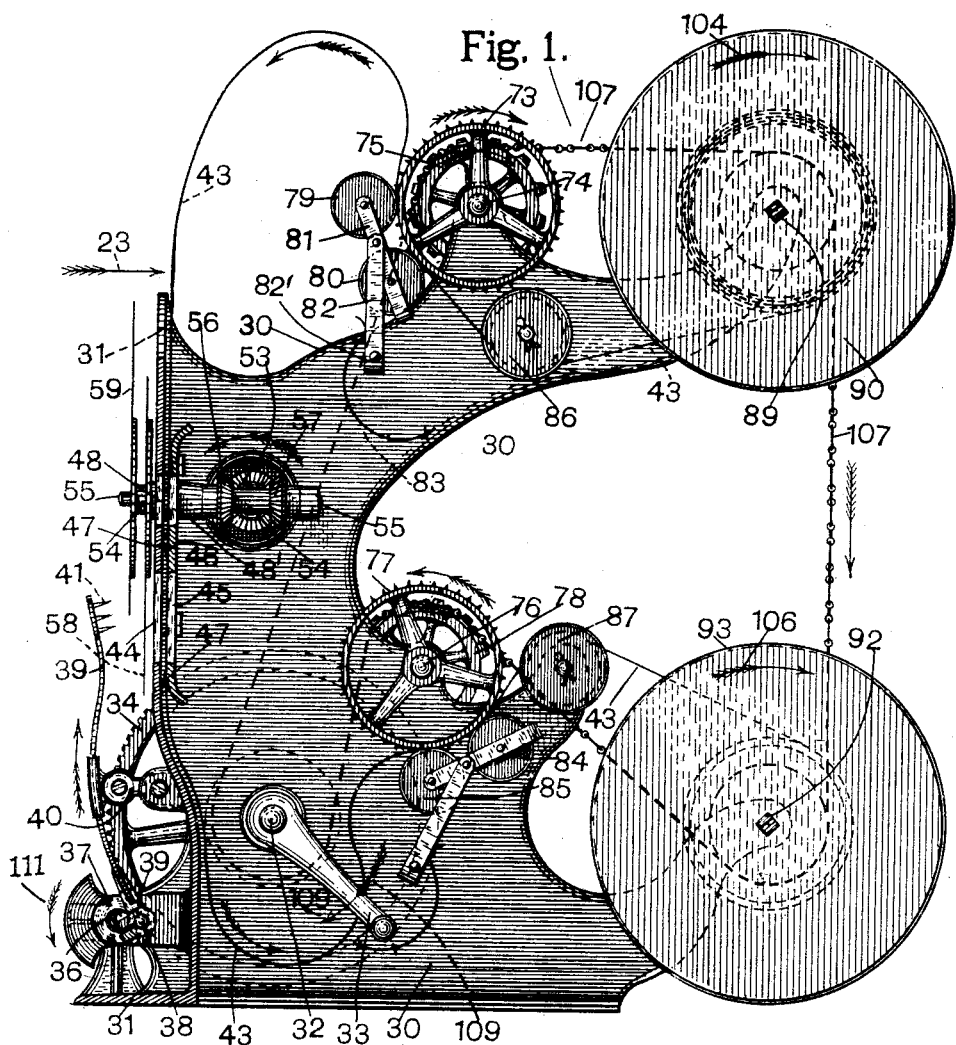
Figure 2:
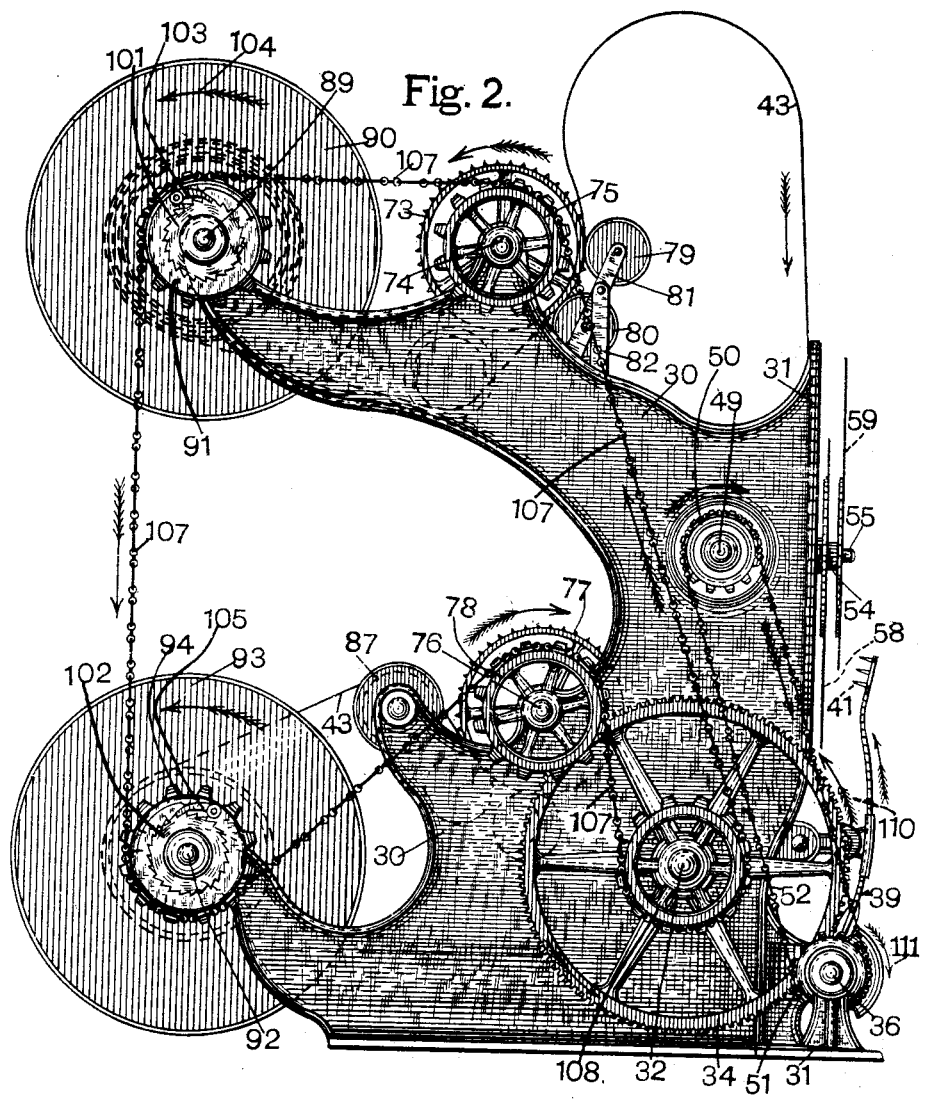
Figure 10:
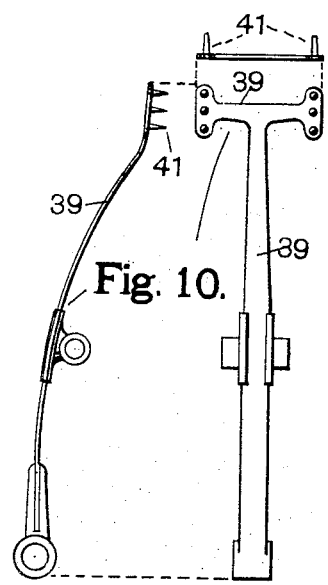
Figure 12:
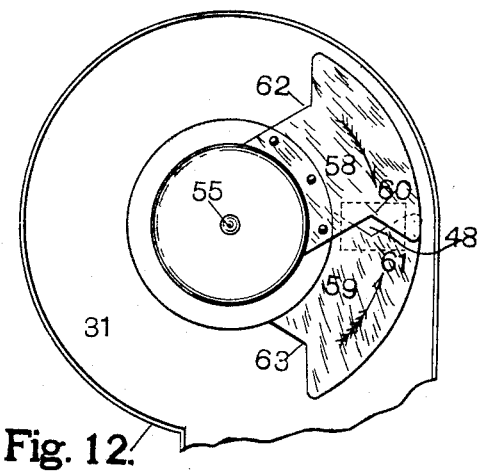
Figure 11:
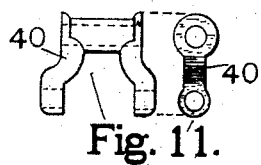

Figure 1 is an elevation looking in the direction indicated by arrow 19, Fig. 3, showing the side upon which the operator stands in manipulating the machine. In Fig. 1 a part of the front plate of the frame and the film-door are shown broken away on a substantially vertical section on broken line 20 21, Fig. 3, to show the picture-window openings and two of the slots through which the teeth of the arm for moving the film are operated, as is hereinafter more particularly described. Fig. 2 is an elevation looking in the direction indicated by arrow 22, Fig. 3, showing the side opposite to that shown in Fig. 1 to illustrate manner of gearing together most of the rotative parts, which latter are plainly shown in Fig. 1. Fig. 3 is a rear elevation looking in the direction indicated by arrow 23, Fig. 1, to illustrate the mechanism for intermittently moving the photographic film and the duplex reverse-movement shutter and its position relative to the film-moving mechanism. Figs. 4, 5, and 6 are vertical sections of the front plate on line 20 21, Fig. 3, with part of the film-moving mechanism in side elevation in several different positions to illustrate manner of operation and relative position of the parts at different points in the revolution of the driving-shaft. Fig. 7 is a vertical transverse section on broken line 24 25, Fig. 8, of one of the reels upon which the picture-films are stored. Fig. 8 is an axial section of one of the film-reels on broken line 26 27, Fig. 7. Fig. 9 is a heart-shaped figure to illustrate the normal path described by the teeth of the film-moving arm in the mechanism shown in Figs. 4, 5, and 6, the broken line 28 29 in Fig. 9 serving to represent the surface of the film-door, against which the photographic film is usually held by springs. Fig. 10 shows, respectively, a side and rear elevation, together with a plan of the film-moving arm. Fig. 11 shows, respectively, a plan and a side elevation of a link adapted to movably connect the middle of length portion of the film-moving arm shown in Fig. 10 with the rear plate of the frame of the machine. Fig. 12 is a rear elevation of a portion of the top of the front plate of the machine, together with the duplex shutter, to illustrate the action of the shutter in cutting off the view of the moving photographs at the picture-window.

Similar numerals designate like parts throughout the several views.

The principal portion 30 of the frame is plainly shown in Figs. 1 and 2, and to the rear of this frame, at a right angle thereto, is secured the minor or rear frame 31, which is shown in edge view in Figs. 1 and 2 and is plainly shown in Fig. 3. Mounted in a boss of the frame 30 is the driving-shaft 32, which in this instance is to be revolved by means of the hand-crank 33, Fig. 1.

At 34 is a cog-wheel at the rear end of shaft 32, and this wheel engages a small pinion 35, Fig. 3, fixed to a shaft 36, which latter is mounted horizontally in lugs in the lower portion of the rear frame 31. In this instance the proportion is one to ten in the relative number of teeth in pinion 35 and cog-wheel 34. At one end of shaft 36 is secured a crank 37, and mounted on the crank-pin 38 is the lower end of the film-moving arm 39, and at 40 is a link which has one end pivotally attached to about the middle of length portion of arm 39, while the other end of the link is pivotally attached to the rear frame 31. At the upper end portion of arm 39 is shown a series of projecting teeth 41, adapted to engage a series of holes 42 at each side of the picture-film 43, Fig. 3. Through the front frame-plate 31 are two vertical slots 44, in and along which the teeth 41 of the film-moving arm 39 operate, the teeth projecting through and beyond the slots and into similar slots 45 in the film-door 46. (Shown in section in Fig. 1.) The film-door 46 is pivotally mounted so as to open, but when closed, as usual, leaves a space between the inner face thereof and the front plate of the frame, and this space is of dimensions adapted to easily admit the free upward or downward passage of the picture-film 43, the latter being held from too free a movement by the pressure of a contact-spring, whose ends are shown at 47 in Fig. 1 and whose middle of length portion always holds the film yieldingly against the surface of the film-door 46.

In Figs. 1, 3, and 12 can be seen the picture-window 48 in the plate of the rear frame 31, and at 48' in Fig. 1 is the picture-window in the film-door 46.

At 49, Fig. 2, but not shown in Fig. 1, is mounted a shaft through the front frame 30, one end of this shaft having a chain-wheel 50 secured thereto and which latter is geared by chain 52 to chain-wheel 51, the latter having same number of teeth as chain-wheel 50 and mounted on shaft 36. At the inner end of shaft 49 is secured a miter cog-wheel 53, Fig. 1. Mounted through a boss in front frame 31 is a hollow shaft 54, and through this shaft is mounted another shaft 55, the inner end of the latter being additionally supported by being mounted in a lug on the front frame 30. Secured to the inner end of hollow shaft 54 is a miter cog-wheel 56, which is engaged by miter cog-wheel 53, and on shaft 55, which is mounted through hollow shaft 54, is secured a miter cog-wheel 57, which is also engaged by miter cog-wheel 53, so that by the revolution of chain-wheel shaft 49 in either direction shafts 54 and 55 revolve in opposite directions. At the outer end of hollow shaft 54 is secured a shutter 58 and at the outer end of shaft 55 is secured shutter 59. Each of these shutters have length radially from the shafts sufficient to fully cover the picture-window 48, Figs. 3 and 12, and at the side edges are notches, as at 60, 61, 62, and 63, so that no line of this marginal edge is parallel with the marginal lines of the picture-window.

As illustrated in Fig. 12, it is intended that in the revolution of each shutter the light in the picture-window will be cut off, beginning at the corners of the window and ending in the center thereof, and it is obvious that the light from the window would be again admitted during the passage of the shutters in the reverse order, the light being first admitted at the center of the window, the space permitting the light to pass being gradually enlarged outwardly from the center toward the corners of the window.

It is intended to make the portion of the shutters which cover the windows of mica or some other semitransparent heat-resisting material, so that not all but only a part of the light is cut off in order to avoid the disagreeable flicker incident to the use of opaque shutters.

In Figs. 4, 5, and 6 the action of the film-moving arm is illustrated, and in Fig. 4 is shown the outer half-way position of the crank-pin when the top of the arm is held in against the surface of the rear frame and also in broken lines the inner half-way position of the arm when the top thereof is held away from the surface of the rear frame.

In Figs. 5 and 6 are shown, respectively, the extreme upward and extreme downward position of the crank-pin and arm when the upper end of the arm is held in contact with the surface of the rear frame-plate. By securing a point to some part of the upper end of the arm and holding this point in contact with a soft plane surface the figure shown in broken line at 64, Fig. 6, or in a solid line in Fig. 9 will be described. It is seen that the right-hand solid line in Fig. 9, between the corner curves 65 and 66, is almost straight, but that this portion of the line joins the other or almost horizontal parts of the figure at the top and bottom by curves 65 and 66 of very small radius.

Should the film-moving arm be so designed that it is practically unyielding from the crank-pin to the top end and the link and its attachments are also unyielding, and should such an arm be made to operate without contacting some surface of, say, like the rear frame-plate, as shown, and free to describe the curved figure shown in Fig. 9, it would not be adapted to the purpose of operating the teeth to engage the holes in the margin of the picture-film, for the reason that at the instant the teeth engage or disengage at the termination of the stroke instead of moving straight into or out of the holes in the film the teeth would move in the short radius curves 65 and 66, and thus saw the margin of the holes and quickly ruin the film for the purpose intended.

By providing some means whereby the film-moving arm or its connections are not rigid but elastic, so that the upper end portion thereof may contact some surface just before the short curves begin, then the arm will move the teeth practically square into and out of engagement with the holes in the film, and when the short curves begin the teeth are stopped, and instead of moving in the curves move downwardly or upwardly in the action of moving the film, which is in the manner of a crank circular motion converted into a reciprocating rectilinear motion, so that the film is gradually started and gradually brought to rest at the termination of each movement.

In Figs. 1, 2, 3, 4, 5, 6, and 10 the film-moving arm is made of a curved spring having a crank-pin box secured at the lower end and a link pivotal fastening near the center of length portion, while the top end is fashioned into a cross whose arms terminate in enlarged ends into which are secured six teeth 41, in this instance three on each side, which are adapted to engage in the holes 42 at the sides of the film 43. (Illustrated in Fig. 3.)

It is obvious that a film-moving arm such as shown and described would be substantial enough to withstand the quick movements it is intended to make and at the same time be sufficiently elastic to contact a guide-surface at the upper end portion without injuring or without causing undue friction, noise, or vibration of the adjacent parts.

Nothing new is involved in the substitution of an eccentric for the crank-pin 38 for imparting a circular movement to the lower end of arm 39.

The means employed for carrying, delivering, and winding up the film on a reel when the machine is operated in either direction is illustrated in Figs. 1, 2, 3, 7, and 8, in which 73 is a toothed wheel attached at one end of shaft 74, while a chain-wheel 75 is attached at the opposite end, the shaft being mounted to revolve in bosses attached to the top portion of the front frame 30. In bosses in the middle portion of frame 30 is mounted to revolve a shaft 76, having a toothed wheel 77 secured at one end and a chain-wheel 78 secured at the other.

At 79 and 80 are two rollers, which bear and freely roll upon toothed wheel 73, the two rollers being mounted in a frame 81, which is pivotally mounted in a second frame 82, which latter is pivotally mounted to a pin 82', projecting from the side of front frame 30. A spring 83, bearing against frame 82, holds the rollers yieldingly against the toothed wheel 73. A similar set of rollers 84 and 85 and mounted in frame and with a spring to produce a yielding pressure of the roller against toothed wheel 77, as above described, is shown in Fig. 1.

At 86 is a flanged guide-roller mounted to revolve on a projecting pin near toothed wheel 73, and another flanged guide-roller 87 is similarly mounted to revolve on a pin near toothed wheel 77.

At the front top portion of the machine is mounted in bosses a shaft 89, which has a film-reel 90 mounted at one end and a chain-wheel 91 at the opposite end, and at the lower front part of the machine is mounted in bosses a shaft 92, having a film-reel 93 mounted thereon at one end and a chain-wheel 94 at the other end.

In Figs. 7 and 8 the film-reels are shown to comprise a spool 95, having a length greater than the width of the picture-film and provided in this instance with an axial square hole 96 to receive the square end portions of shafts 89 and 92. There are wide flanges 97 and 98 secured to the ends of spool 95 to protect the edges of film 43, Fig. 3. Loosely mounted on spool 95 is a band 99, which is held from freely revolving by the frictional contact of a spring 100, which is disposed in a groove in the side of the spool. Chain-wheels 91 and 94, Fig. 2, are each connected to revolve in but one direction with their respective shafts 89 and 92 by means of a clutch, which in this instance consists of a ratchet-wheel 101, firmly secured on shaft 89, and ratchet-wheel 102, firmly secured on shaft 92. Chain-wheel 91 is provided with a ratchet-pawl 103 and when revolving in the direction indicated by arrow 104 on the reel, Fig. 2, will not engage ratchet-wheel 101, but will be engaged therewith if revolved in the opposite direction.

The above-named condition is reversed in respect to chain-wheel 94, whose pawl 105 engages the teeth of ratchet-wheel 102 when revolved in the direction indicated by arrow 106 on lower reel, so that this reel is compelled to revolve with shaft 92.

The clutches connecting the chain-wheels 91 and 94 with their respective shafts are arranged relatively so that when picture-film 43 is being unwound off of one reel the same is being wound up on the opposite reel and that whenever the movement of the film through the machine is reversed the relative conditions of the means for permitting one of the reels to freely revolve by a pull on the film and the other be forced to revolve in winding up the film is also reversed.

No particular clutch mechanism is necessary to cause the chain-wheels to each turn its shaft in but one direction, as many well-known forms of both friction and ratchet clutches are perfectly adapted to the purpose. Neither is it necessary to arrange the clutches to connect the reel-shafts with the chain-wheels, so that each shaft revolves in an opposite direction to the other or in the same direction; but it is necessary that the picture-film be wound onto one reel while it is being unwound from the opposite reel whether the reels revolve in the same or in different directions.

The means for revolving the reels in unison with the other revolving parts of the machine is shown in Fig. 2 and consists of an endless chain 107, which first engages with the teeth of a chain-wheel 108, attached to driving-shaft 32. Thence the chain engages successively with chain-wheels 75, 91, 94, and 78, which are all of the same size and number of teeth.

In practice the spools in each of the reels should be of a diameter not less than that of the toothed wheels 73 and 97. In this instance the strip picture-film is shown as having the main portion thereof wound on upper reel 90. Thence it passes from the lower side of the reel over guide-roller 86. Thence the film passes between rollers 79 and 80 and wheel 73, with whose teeth the holes in the film are engaged. Thence the film passes upwardly and over in a curve and downwardly between the front of the rear frame-plate 31 and the film-door 46, thence downwardly and around under the crank-shaft boss and between lower rollers 84 and 85 and the toothed wheel 77, whose teeth are engaged with the side holes in the film, thence over lower guide-roller 87 and then the end attached to the spool in lower reel 93.

The drawings show the mechanism for delivering, intermittently moving, and winding up the photographic film in either direction; but the projecting and photographic lenses are not shown, for it is obvious these parts may be easily attached in the center line of the picture-window in the proper position, as is common in other machines of the same kind.

In operation if the hand-crank 33 is turned in the direction indicated by arrow 109 the large cog-wheel 34 at the rear end of driving-shaft 32, Fig. 2, will revolve in the direction indicated by arrow 110 and cause the shaft 36 to revolve in the direction indicated by arrow 111, and thereby reciprocate the arm 39 in the manner already described. If a photographic film, as 43, is in proper position under the film-door 46, Fig. 1, the teeth 41 of arm 39 will engage in the marginal holes 42, Fig. 3, of the film and intermittently draw the film downwardly to a distance equal to the stroke of the arm 39, the film remaining stationary during the time the teeth 41 are describing the outward parabolic curve from 65 around to 66, as shown in Fig. 9, the direction of the movement in this curve being indicated by the arrow 112 in Fig. 6. During the time the film is moving the shutters 58 and 59 pass in different directions in front of the picture-window 48, as hereinbefore indicated. The means for delivering the photographic film from the reels, whereby a loose loop thereof is always between the reels 90 and 93, consists of the toothed wheels 73 and 77, which being in this instance of a circumference equal to ten downward strokes of the teeth 41, and being so geared to shaft 36 that they revolve but one revolution to ten strokes of the teeth, it is obvious that a loose loop between the wheels 73 and 77 and the teeth 41 would always be maintained. The operation of the reels whereby the photographic film is unwound off of or wound upon either of the reels 90 and 93 at the proper time, automatically, when the machine is revolved in either direction has been already described.

I attach importance to the fact that the film-moving arm be resilient from the boss, where the link is pivoted, to the upper end—that is, between the pivotal center of the link and the upper free end. This construction permits the teeth to remain at practically a right angle to the face of the film during the whole of the downward stroke.

I claim as my invention—

1. In a moving-picture machine, the combination with a film-moving arm resilient throughout its length and having an integral cross portion at its upper free end and intermediate its ends having a lug, of a link connected to said lug and to a fixed part of the machine, and a crank connection with the lower end of said arm, as set forth.

2. In a moving-picture machine, the combination with a film-moving arm having pivotal connection intermediate its ends with the frame and resilient from its pivot to its free upper end and the latter formed T shape, the upper end of said arm being out of vertical line with its lower end and pivot, of a crank connected with the lower end of said arm, substantially as described.

3. In a moving-picture machine, the combination with a support, of shafts journaled thereon, a friction film-spool on each shaft, a film-mover, means for operating said mover, chain-wheels mounted on the shafts of said spools to revolve in but one direction on their respective shafts, ratchet-wheels on said shafts, and oppositely-disposed pawls on the chain-wheels engaging said ratchet-wheels and reversible with the reversal as to their operative position of the direction of movement of the film.

4. In a moving-picture machine, the combination with a support, of shafts journaled thereon, a friction film-spool for each shaft, a film-mover, means for operating the mover, chain-wheels mounted on the shafts of said spools to revolve in but one direction on their respective shafts, ratchet-wheels on said shafts, oppositely-disposed pawls mounted on the chain-wheels and means whereby said spools are automatically reversed in their movement by the reversal of the direction of movement of the film, as set forth.

5. In a moving-picture machine, the combination, with a film-support provided with friction film-spools, of a pawl and ratchet for each spool, means for simultaneously moving the pawls in opposite directions relatively to their wheels, and a film-mover.

6. In a moving-picture machine, the combination, with a support, of two shafts journaled therein, each of which is provided with a friction film-spool and a ratchet, a sprocket-wheel journaled on each shaft and provided with a pawl, a sprocket-chain on the wheels, a film-mover, and means for operating said chain and mover in either direction.

7. In a moving-picture machine, the combination, with a support, of four shafts journaled therein, two of which are each provided with a friction film-spool and a sprocket-wheel, and the other two are each provided with a sprocket-wheel and a toothed film-feeding wheel, a chain over the sprocket-wheels, a reciprocatory film-mover, and an operating-wheel for moving the chain and the film-mover.

8. In a moving-picture machine, the combination, with a support, of four shafts journaled therein, two of which are each provided with a friction film-spool and a sprocket-wheel and the other two are each provided with a sprocket-wheel and a toothed wheel, a spring-actuated frame pivotally mounted adjacent to each toothed wheel, a roller-frame pivotally mounted in each of said frames provided with a set of rollers in position to engage with the toothed wheel, a guide-roller adjacent to each toothed wheel, a chain over the sprocket-wheels, a reciprocatory film-mover, and an operating-wheel for moving the chain and the film-mover.

9. In a moving-picture machine, the combination, with a film-support provided with a picture-window, of two shafts journaled in the support at right angles to each other, a sprocket-wheel and a bevel-wheel on one of the shafts and a shutter and a bevel-wheel on the other one, an intermittent film-mover provided with a sprocket-wheel, and a sprocket-chain on the sprocket-wheels.

10. In a moving-picture machine, the combination, with a film-support provided with a picture-window, of a shaft journaled in the support provided with a bevel-wheel, two shafts journaled in the frame adjacent to the window, one within the other, the outer end of each of which shafts is provided with a shutter and the inner end is provided with a bevel-wheel in engagement with the bevel-wheel on the first-mentioned shaft, an intermittent film-mover, and means for connecting the mover with the first-mentioned shaft.

11. In a moving-picture machine, a spool composed of a body with axial opening, flange and a groove parallel with said opening, a band loosely mounted on said body, and a friction device held in said groove and bearing against the inner face of said band for preventing free revolution of said band, as set forth.

12. In a moving-picture machine, the combination with a film-support, of shafts journaled therein, toothed wheels on said shafts, sprocket-wheels on said shafts, pawls and means for moving the same simultaneously in opposite directions a pivotally-mounted frame near each of said wheels, pivoted supports for said frames, and rollers carried by each of said frames and bearing upon and freely rotating in contact with said toothed wheels, as and for the purpose specified.

13. The combination with a film-support provided with a picture-window, of two shafts one within the other and independently movable, and a shutter carried by each shaft, said shutters being so constructed each of a length radially to fully cover the picture-window that no line of the marginal edge shall be parallel with the marginal lines of the picture-window when said shutters are overlapped, as set forth.

14. In a moving-picture machine, the combination with a film-support having a picture-window, of a hollow shaft, a second shaft working in said hollow shaft, miter cog-wheels on said shafts, means for engagement therewith for moving said shafts in opposite directions, and a shutter carried by each of said shafts each of a length radially to cover the picture-window, said shutters being provided at their side edges with notches disposed to admit and shut off the light as the shutters overlap opposite the picture-opening, substantially as and for the purpose specified.

15. In a moving-picture machine, the combination with a film-support provided with a picture-window, of two independently-movable shafts, one within the other, and a shutter carried by each of said shafts, each shutter being of a length radially to fully cover the picture-window and each having at its side edges notches disposed to admit and shut off light in reverse order as the shutters overlap opposite the picture-opening, substantially as described.

OSCAR SNELL.

Witnesses:
EDWARD E. WILSON,
H. L. BROWN.